United States Patent
Christensen

[15] 3,702,917
[45] Nov. 14, 1972

[54] TOOL FOR FORMING AND SHAPING WAX-LIKE SUBSTANCES

[72] Inventor: Carl R. Christensen, 5412 Cottage Avenue, San Diego, Calif. 92120

[22] Filed: April 16, 1970

[21] Appl. No.: 29,097

[52] U.S. Cl. ..................219/230, 15/421, 32/70, 219/233, 219/236, 228/20, 228/53, 401/2
[51] Int. Cl. ........H05b 1/00, B23k 3/00, A47l 13/32
[58] Field of Search..............219/221, 227, 229–231, 219/233, 235–240; 222/146 R, 146 HE; 32/70; 228/19, 20, 51–53; 401/1, 2; 15/419, 421

[56] References Cited

UNITED STATES PATENTS

| | | | |
|---|---|---|---|
| 2,826,667 | 3/1958 | Brillinger | 219/230 X |
| 2,960,591 | 11/1960 | Brillinger | 219/230 X |
| 2,955,188 | 10/1960 | Campo | 219/230 X |
| 3,422,247 | 1/1969 | Royston et al. | 219/230 |
| 3,211,354 | 10/1965 | Dugard et al. | 228/20 |
| 2,197,995 | 4/1940 | Crowley | 15/419 UX |
| 3,169,499 | 2/1965 | Armanno | 228/20 |
| 1,140,660 | 5/1915 | Brizius | 228/20 UX |
| 3,271,555 | 9/1966 | Hirshon et al. | 219/236 UX |
| 2,973,422 | 2/1961 | Smith | 219/240 |

FOREIGN PATENTS OR APPLICATIONS

| | | | |
|---|---|---|---|
| 617,414 | 8/1935 | Germany | 219/237 |

*Primary Examiner*—A. Bartis
*Attorney*—Carl R. Brown

[57] ABSTRACT

A tool for forming and shaping wax-like substances having an open-ended conduit tool tip with one end forming a working end and the other end being inserted into a wax holding container. The sealed container is supported on a handle and has a tube member that communicates the container with a source of suction through the handle. An electric heating element encircles the tool tip to heat the tool tip and thus the wax. Electrodes connected to the heating element and fitted in sockets in the handle and the tube member support the tool tip and container on the end of the handle. The axis of the container is substantially normal to the axis of the handle, so the heated wax drawn through the tool tip is deposited into the container without communicating through the tube member to the source of suction in the handle. The entire tool head structure is solely supported by the electrodes and the tube member.

2 Claims, 16 Drawing Figures

PATENTED NOV 14 1972 3,702,917

INVENTOR.
CARL R. CHRISTENSEN
BY

ATTORNEY

PATENTED NOV 14 1972 3,702,917

INVENTOR.
CARL R. CHRISTENSEN

BY

ATTORNEY

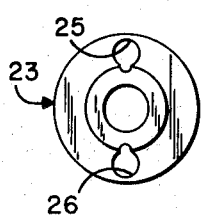
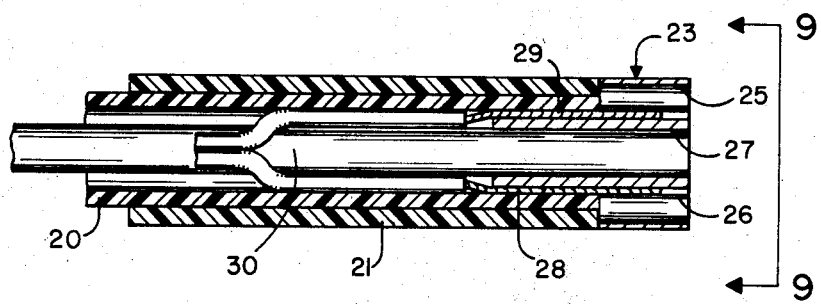
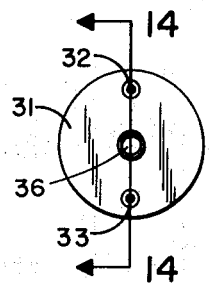
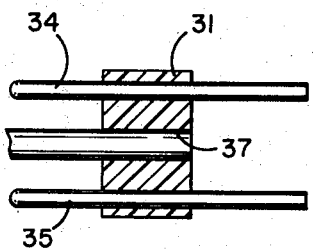
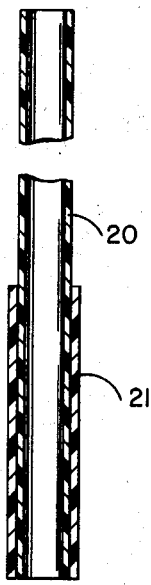
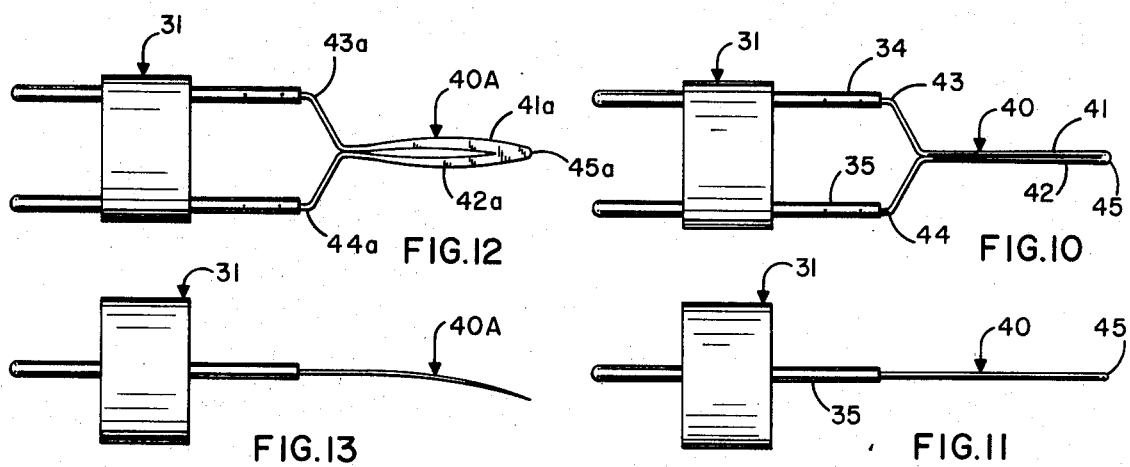

TOOL FOR FORMING AND SHAPING WAX-LIKE SUBSTANCES

BACKGROUND OF THE INVENTION

In the art of making or manufacturing irregular metal parts of intricate design such as custom made jewelry or dental inlays, where a high degree of accuracy and fine detail of execution is necessary, a process known variously as the "lost wax" process or "investment casting" process is used. The process consists essentially of molding a model of the part, in all its exact detail out of a relatively hard carnauba wax. The wax model is then cast in a casting material which is relatively heat resistant. After the casting material is set, the entire piece is heated sufficiently high to completely melt all of the wax model leaving a cavity which is the exact negative of the model to be cast. Molten metal is then poured into the cavity and upon solidifying, the mold is then broken away from the casting, resulting in a metallic model which is the exact duplicate of the wax original.

It has been found highly advantageous to work and construct the wax models by the use of heated tools, some of which remove unwanted wax, others which deposit wax in areas where it is desired to build up the model. When using heated tools it is essential to immediately remove the melted wax from the point of melting in order to properly form the figure.

While there are known tools for working wax in the manner previously described, such tools are normally bulky and have limited uses, as dictated by the particular tool tip that is fixed to the tool handle. While in some tools, the tool tips are interchangeable, the tool tips in these tools are not capable of carving the wax and removing or depositing the wax simultaneously. Further such tool tips are normally not capable of providing either suction or air pressure to the wax, to either remove wax or smooth its surface as may be necessary in providing an improved wax model.

Thus it is advantageous to have a new improved tool for forming and shaping wax-like substances having a handle that is capable of receiving many different types of tool tips, that may be used in many different operations in carving and shaped wax models, and that is in addition capable of providing suction or air pressure to the tool tips, which tool tips are supported on the end of the handle member by either the electrodes that heat the tool tip, or by the electrodes and the tube member for carrying suction or air pressure to the tool tips or to containers used in conjunction with the tool tips for inserting wax into the wax model, or removing wax from the wax model.

SUMMARY OF THE INVENTION

In the exemplary embodiment of my invention, a common handle member is used to support a plurality of different tool heads that may be selectively used in many different operations in wax carving. The handle member provides a means for supporting each of the tool heads and at the same time heating the tool tips through the supporting members. Further the handle member provides a source of air pressure or vacuum to the tool tips, in different configurations thereof, that is used in wax carving. In the embodiments of the tool tips using vacuum or air pressure, a container is provided as a part of the tool head structure for either receiving the melted was removed in the carving operation, or to supply wax for insertion into the wax model as desired. In these embodiments, the cylinder member is oriented to accept the wax removed in a manner that it does not interfere with the suction conduit in the handle member. Also the tool tip structures are supported by the conduit to handle member as well as the electrodes supporting members. Thus the tool tip structure may be light weight and thus more easily used in the fine techniques of wax carving.

One of the objects of my invention is to provide electrically heated wax carving tools, which upon melting the wax immediately removes the molten wax from the original position, thereby resulting in a carving or cutting action to form the desired figure.

It is frequently necessary to apply wax to the model to build up certain desired details. In so building up a model it is essential to control both the temperature and rate of application, and the amount of wax which is applied at any given point. A further object of my invention is to provide a wax applying tool which can apply wax a various temperatures and at varying rates of speed depending upon the desires and wishes of the operator.

A further object of my invention is to provide a wax working tool wherein, with a single handle and source of electricity, a great many different types and forms of tips can be readily inserted or removed, to quickly change the tip to meet the various demands of the wax carving art.

These and other and further objects and advantages will become apparent from the drawings and the specifications relative thereto.

In the drawings:

FIGS. 1, 2, 3, and 4 are plan views of wax carving tools showing modifications of the carving tips.

FIG. 8 is a fragmentary sectional plan view of the handle member illustrated in FIGS. 5, 6 and 7.

FIG. 9 is an end view of the handle shown in FIG. 8 taken on line 9—9 of FIG. 8.

FIGS. 10 and 12 are detailed plan views of the removable tips of the tools illustrated in FIGS. 1 and 2 respectively.

FIGS. 11 and 13 are side elevations of the tools shown in FIGS. 1 and 2 respectively.

FIG. 14 is a sectional view of the tool holder adapted for holding the type of tools illustrated in FIGS. 5, 6, and 7.

FIG. 15 is an end view of the tool holder illustrated in FIG. 14 taken from the right hand side.

FIG. 16 is a fragmentary section of a tubular handle used in all of the tools illustrated.

Figure 1:
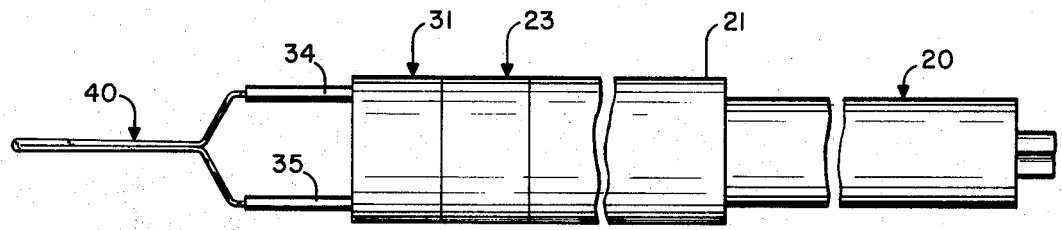
Figure 2:
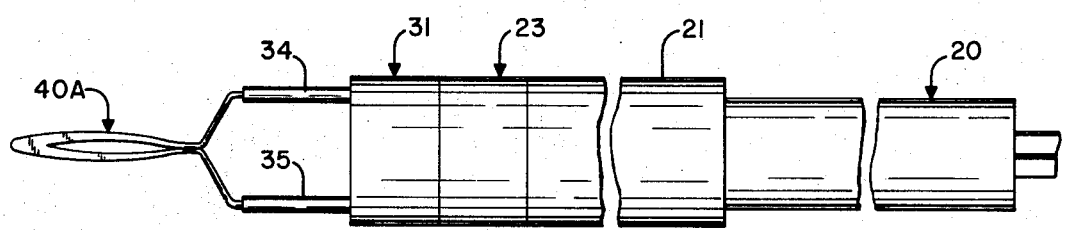

Referring in general to all of the modified forms of tools illustrated, it will be noted that a common handle is used, which comprises of a tubular member designated generally 20 and having an insulated sleeve 21 adjacent the forward end of the tool holder whereby the tool can be handled without the transmission of heat to the fingers of the operator.

The tube is provided with a tool socket designated generally 23 which is adapted to receive in frictional engagement the various modified forms of carving tools.

Referring now specifically to FIGS. 8 and 9 it will be noted that the tool socket is formed with a pair of diametrically disposed conductive sockets 25 and 26 and an axially disposed tubular member 27. Each of the sleeves 25 and 26 are conductively connected to electrical conductors 29 and 28 leading to the rear of the tool through the tubular bore of the tubular member 20 and being connected to a source of electrical current of any standard or desired form, which is not shown herein.

The sleeve member 27 is connected to a tubular member 30 which is connected through the hollow bore of the handle 20 to a source of either compressed air or vacuum as desired in connection with the particular tool tip being used.

The tool holding base such as illustrated in FIGS. 14 and 15 comprises a cylindrical member 31 formed with a pair of diametrically disposed axially parallel bores 32 and 33 into which is disposed a pair of contact pins 34 and 35 in frictional engagement with the inner walls of the bores 32 and 33. The cylindrical member 31 is also formed with an axial bore 36 adapted to receive in frictional engagement a tubular member 37.

The assembly illustrated in FIGS. 14 and 15 is adapted for frictional engagement with the contact pins 34 and 35 disposed into the sleeves 25 and 26 in electrically conductive engagement and the cylindrical member 37 is adapted for disposition into the tubular member 27 to conduct either vacuum or compressed air to the respective tools as may be desired.

As will be seen in FIGS. 10 and 11, the specific wax carving tool tip designated generally 40 comprises a pair of parallel members 41 and 42 connected at the extreme outer end and being spread apart at the left end to define legs 43 and 44 which are disposed in electrical contact inside the pins 34 and 35 respectively. The carving tool 40 is formed of electrical resistance wire which, upon being connected to a source of electricity through the pins 34 and 35, generates sufficient heat to melt the wax being carved.

The close proximity of the legs 41 and 42 define a very narrow gap therebetween which acts as a capillary tube to cause melted wax to flow away from the wax being carved, so that upon touching the end 45 to the wax a portion thereof is melted and conducted away, thereby carving the wax to the desired figure.

FIGS. 12 and 13 illustrate a modification of the tools shown in FIGS. 10 and 11 in that the legs corresponding to 40 and 41 have been flattened. The numerals designated 40a to 45a inclusive are intended to indicate similar parts to the tool illustrated in FIGS. 10 and 11, and similar function.

Figure 3:
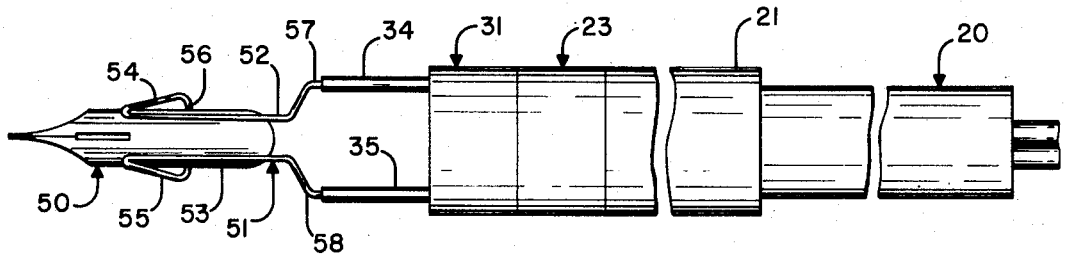
Figure 4:
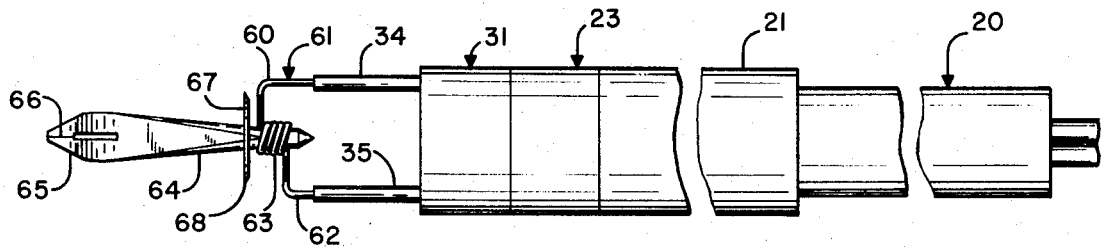

Referring to FIGS. 3 and 4 I have illustrated modified forms of wax carving tools. FIG. 3 shows a tool holder having a replacable tip in the form of a standard ink pen designated generally 50 which is held in frictional engagement by the tip holder designated generally 51 and comprising a pair of parallel arms 52 and 53 and having reversely bent segments 54 and 55 respectively connected by a cross member 56. The angle at which the reversely bent segments 54 and 55 extend backwardly is such that the cross member 56 is spaced from the arms 52 and 53 to thereby hold the bottom portion of the pen tip 50 in a tight frictional engagement against said two parallel arms 52 and 53. The tool is connected to the tubular members 34 and 35 by means of end portions 57 and 58. It is readily apparent that different tips can be inserted by removing the tip 50 and inserting in frictional engagement, a pen having a different size or configuration tip for various detail wax carving jobs.

FIG. 4 illustrates a further modification of a tool comprising a tool holder designated generally 60 and composed of legs 61 and 62 electrically connected to the tips 34 and 35 and having their other end interconnected by means of a coil 63. It will be understood that the tool holders 60 is formed of electrical resistance wire so that heat is generated in the coil 63. The tool in this instance comprises a tip 64 having a broad spoon shaped end 65 and formed with a split 66 acting as a capillary tube for conducting wax away from the figure being carved.

A collar such as 67 is disposed over the tool 64 adjacent the coil 63, and is formed with sharp peripheral edges such as 68. It has been found that heated wax tends to creep upwardly and fill the tool and coil 63 with wax thereby making if difficult to remove the tool tip 64 from the coil 63 where it is held by frictional engagement. The collar 67, particularly one having sharp edges such as 68, prevents wax from travelling upwardly to the coil 63.

Whereas I have illustrated the collar 67 only in connection with the tools shown in FIG. 4 is will be understood that a similar collar can be applied to any of the tools to prevent wax from migrating upwardly to the other parts of the assembly.

Figure 5:
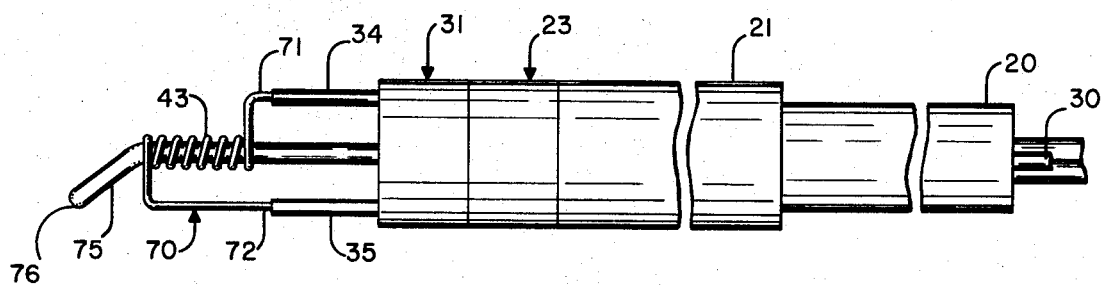
FIGS. 5, 6 and 7 are side elevations os wax carving tools showing modified forms of of tips employing heated air or vacuums.

Referring now to FIG. 5 I have illustrated a tool for carving and polishing wax carvings wherein I employ heated compressed air. The specific tool comprises an electrical heating and holding element designated generally 70 and comprising a pair of electrically conductive legs 71 and 72 adapted for electrical contact with connector pins 34 and 35. The legs 71 and 72 are connected at the outer end by means of a coil 73 so that the application of electricity generates heat, in the coil 73. A tubular member 75 is held in frictional engagement with the coil 73 and is provided with an orifice at the end 76. The tube communicates with the tube 30 through the sleeve 37. By applying the desired air pressure through the tube 30 warm or hot air is expelled through the orifice 76. By directing the heated air onto the desired parts of the wax carving, the wax carving can be polished to a very high degree.

Figure 6:
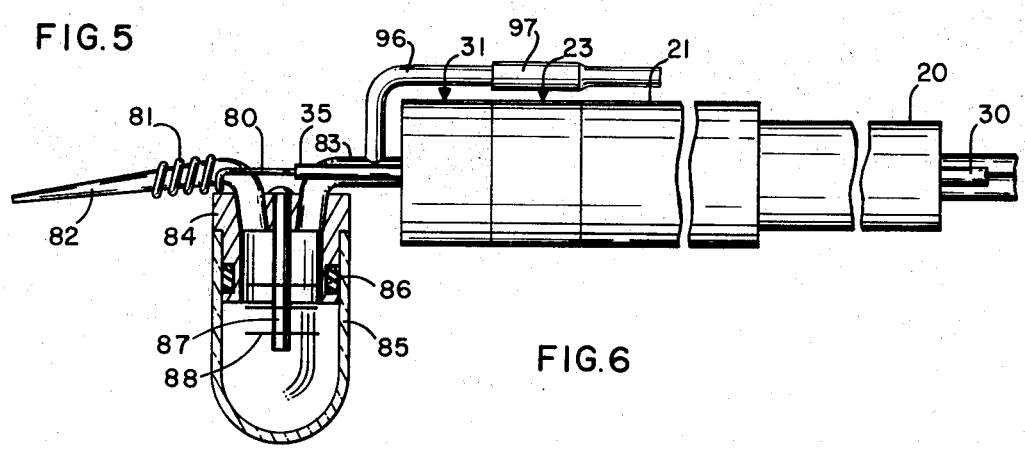

FIG. 6 illustrated a further modified form of the heated air tool adapted for wax carving. It comprises in general a heating element having a pair of legs only one of which is shown as 80, it being understood that a corresponding leg is connected to the conductor pin 34. The two legs are connected at the outer end by coil 81 adapted to frictionally support the carving tool. The carving tool comprises a tip 82 frictionally engaged and supported by the coil 81 and a tube 83 in communication with the tube 30 through the sleeve 37. The two tube members 82 and 83 are bent downwardly and communicate through a cylindrical member 84 to the interior of a chamber. A cover member 85 is frictionally held in place by means of an "O" ring 86. The "O" ring 86 acts both as an frictional engagement and as a sealing member.

A rivet or conductive post 87 is in frictional engagement axially through the cylindrical member 84 and is provided with heat dissipating fins 88.

In the use of this particular modification electrical energy is supplied to the coil 81 which heats the tip 82 and a source of vacuum of any desired type, is connected through the tube 30 to the interior chamber of the cover member 85. The heated tip 82 upon being touched to the wax figure being carved melts some of the wax at a limited area and the vacuum causes the melted wax to flow upwardly through the tube 82, and into the chamber in the cover 85, where it flows to the bottom to permit the continuation of the operation until the chamber is filled. The conductive post 87 and fins 88 conduct part of the heat generated in the coil 81 into the wax held in the chamber to thereby keep it in a liquid state so that it may be emptied after it is filled. It is desirable to form the post 87 of a material having a relatively high rate of heat conduction, such as aluminum. In the event that the bowl 85 becomes filled with melted wax which is then sucked up through tubular member 83. The wax will then solidify in the sleeve 27 thereby shutting off the vacuum.

Figure 7:
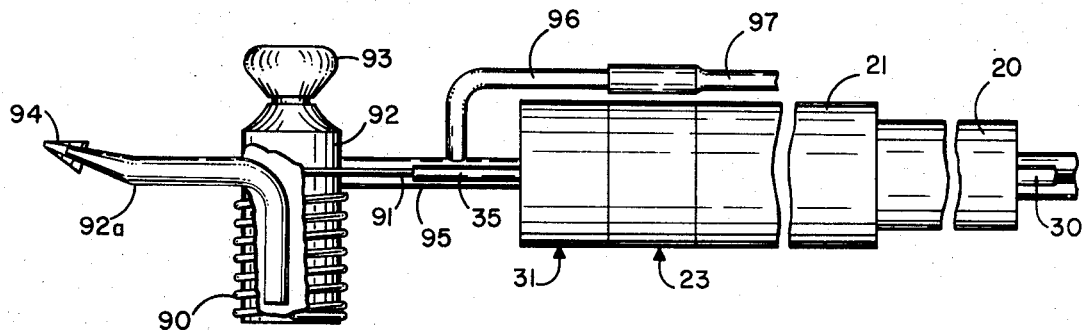

FIG. 7 illustrated a further modified form of tool for wax carving and composes in general and electrical resistance coil 90 connected to the pin 35 and 36 by meanS of an end 91 and another end not shown. The wax carving tool is frictionally held in position by the coil 90 and is heated thereby. It comprises, in general, a hollow cylindrical chamber defined by the cylindrical member 92. The cylindrical member 92 is provided with a removable cap 93 for filling the interior thereof with melted wax. An applicator tip 92a communicates with the interior of the cylindrical chamber 92 and is bent downwardly to communicate therein at approximately the bottom of the cylindrical member 92. The applicator tip can be provided with removable tips such as 94 for applying different sizes or shapes of beads or figures.

A tubular member 95 communicates with the interior of the cylindrical member 92 at the upper level thereof and is connected with the tubular member 30, which in this instance is connected to a source of compressed air. Upon the application of compressed air into the interior of the chamber 92 molten wax is forced out the tip 92a and is applied on the figure being molded.

In order to control the flow of wax I have provided a bypass tube 96 connected to the interior of the tube 95 and having a flexible tubular control valve 97. The operator, in holding the tool, places his finger on the valve 97 and by compressing it shuts off the communication through the tube 96, thereby causing the compressed air to be applied inside the cylindrical chamber 92 to force wax out through the tip 92a. By releasing his finger the operator can permit the compressed air to escape out through the tubular member 96 to in effect prevent any further application of wax through the tip 92a.

Whereas I have illustrated the control mechanism comprising the tubes 96 and 97 only in connection with FIG. 7 it is readily apparent that this type of control can be applied both to both tools shown in FIGS. 5 and 6, to regulate the flow of air or the amount of vacuum.

In the foregoing specification, I have described my invention in what I consider its most practical embodiments. However, it is readily apparent that a great many modifications can be adopted without departing from the invention. The foregoing specifications and drawings are illustrations only and not for the purpose of limitation. The true scope of the invention is set forth in the following claims.

I claim:

1. Wax carving means comprising:

a handle having a surface at one end with a plurality of electrical sockets for electrical connection to a source of electrical energy and a vacuum socket for connection to a source of vacuum, said electrical sockets and said vacuum socket comprising openings in said surface, a tool head removably connected to said handle, said tool head comprising a hollow sealed container having an axis that is substantially normal to the axis of the handle, a tubular tool tip having an open-ended axial bore, said tool having a curved end portion projecting into the interior of said container through an end thereof, a tube with one end curved and extending into the interior of said container through said end and with the other end of the tube projecting into the vacuum socket of said handle member, selectively actuatable by-pass valve means communicating the interior of said tube with the atmosphere for regulating the amount of suction applied to said tool tip, an electric heating element coiled around said tool tip for heating said tool tip, said heating element having electrical terminals for being inserted into said electrical sockets, and said tube and said electrical terminals solely supporting said tool head on said handle.

2. A wax carving means as described in claim 1, wherein said hollow container comprises:

a cylindrical body, a cylindrical envelope in frictional engagement with said body to therewith define a wax container, said cylindrical body being formed with a bore for receiving the tubular end portion of the tool tip, and a second bore for receiving said curved end of the tube.

* * * * *